United States Patent [19]

Aldridge

[11] 4,456,703

[45] Jun. 26, 1984

[54] HIGH SURFACE AREA NICKEL ALUMINATE SPINEL CATALYST FOR STEAM REFORMING

[75] Inventor: Clyde L. Aldridge, Baton Rouge, La.

[73] Assignee: Exxon Research and Engineering Co., Florham Park, N.J.

[21] Appl. No.: 375,828

[22] Filed: May 7, 1982

[51] Int. Cl.$^3$ .................... B01J 21/04; B01J 23/74
[52] U.S. Cl. .................................... 502/335; 502/524
[58] Field of Search ............... 252/466 J; 423/654; 502/335, 524

[56] References Cited

U.S. PATENT DOCUMENTS

| | | | |
|---|---|---|---|
| 3,368,982 | 2/1968 | Milbourne | 252/466 J |
| 3,586,621 | 6/1971 | Pitchford et al. | 252/466 J |
| 3,904,553 | 9/1975 | Campbell et al. | 252/466 J |
| 3,933,883 | 1/1976 | Parthasarathy | 260/449 |
| 4,060,498 | 11/1977 | Kawagoshi et al. | 252/373 |
| 4,233,179 | 11/1980 | Russ et al. | 252/373 |

Primary Examiner—W. J. Shine
Attorney, Agent, or Firm—Marthe L. Gibbons

[57] ABSTRACT

A high surface area nickel aluminate spinel formed on alumina, prepared by a specified method and useful as catalyst support and as catalyst for hydrocarbon treating and conversion processes is provided. A steam reforming process utilizing the nickel aluminate spinel on alumina as catalyst is also provided.

13 Claims, No Drawings

HIGH SURFACE AREA NICKEL ALUMINATE SPINEL CATALYST FOR STEAM REFORMING

BACKGROUND OF THE INVENTION

1. Field of the Invention

The present invention relates to a nickel aluminate spinel on alumina composition characterized by its method of preparation.

The composition is useful as catalyst, catalyst support and catalyst component. The invention also relates to a steam reforming process utilizing the nickel aluminate spinel on alumina as a catalyst.

2. Description of the Prior Art

Nickel aluminate spinel formed on alumina is known.

U.S. Pat. No. 3,368,982 discloses a nickel aluminate steam reforming catalyst. A nickel impregnated alumina is calcined at a temperature ranging from 1900° F. to 2500° F. (1037.8° C. to 1371° C.) to form the nickel spinel structure.

U.S. Pat. No. 4,233,179 discloses steam reforming using a nickel on alumina catalyst promoted with iron and manganese.

U.S. Pat. No. 4,060,498 discloses impregnation of alumina with nickel, lanthanum and silver salts and calcining at 900° C. to produce a steam reforming catalyst.

U.S. Pat. No. 3,933,883 discloses a methanation catalyst comprising nickel and cobalt on a high surface area gamma-alumina. The high surface area alumina was impregnated with a solution of nickel and cobalt salts and calcined at 540° C. and then reduced with hydrogen. The catalyst has a surface area of about 100 to 200 $m^2/g$.

Steam reforming is a well-known process in which the hydrocarbon feed or a hydrocarbon derivative, such as a lower alcohol, is contacted with steam in the presence of a catalyst to produce a hydrogen-containing gas. See *Hydrocarbon Processing*, April 1973, pages 118–120. The proportion of hydrogen in the gaseous product will depend upon operating conditions and desired end products such as fuel gas, synthesis gas, methane-rich gas.

SUMMARY OF THE INVENTION

In accordance with the invention there is provided, a composition comprising a nickel aluminate spinel on an alumina support, said composition having been prepared by the steps which comprise:

(a) subjecting an alumina having a BET surface area of at least about 50 $m^2/g$ to at least one impregnation with a nickel component;

(b) calcining the nickel-impregnated alumina at a temperature ranging from about 600° C. to about 1000° C., and (c) recovering a composition comprising nickel aluminate spinel on an alumina support, said composition having a BET surface area of at least 50 $m^2/g$.

DETAILED DESCRIPTION OF THE INVENTION

The nickel aluminate spinel on alumina composition of the present invention is prepared as follows: an alumina is subjected to at least one impregnation with a nickel component. The impregnation may be performed as a series of impregnations. If desired, the impregnation may be performed as a series of alternating impregnations and drying steps. The alumina starting material may be any alumina having a BET surface area of at least 50 $m^2/g$, preferably a surface area ranging from about 50 to 500 $m^2/g$, such as gamma alumina, eta alumina, theta alumina or alumina hydrogel. The nickel component may be any of the nickel salts such as nitrates, chlorides, acetate, formate, sulfate, chlorate, etc., when an aqueous liquid medium is used. The liquid impregnating medium may be a nonaqueous fluid in which the nickel component is dispersed or dissolved. The impregnation is conducted with a liquid medium having a nickel concentration such as to provide from about 1 to about 57 weight percent nickel, calculated as elemental nickel, based on the weight of the alumina starting material. The nickel-impregnated alumina is separated from the liquid medium by conventional methods such as filtration and dried at a temperature sufficient to evaporate the liquid medium. The nickel-impregnated alumina is recovered and calcined at a temperature ranging from about 600° C. to about 1000° C., preferably from about 700° C. to about 1000° C., more preferably from about 800° C. to 1000° C., for a time sufficient to convert at least a portion of the nickel component to a nickel aluminate spinel on the surface or periphery of the alumina. Preferably, the calcination is conducted for a time sufficient to convert at least 85 percent, more preferably at least 95 percent of the nickel component to a nickel aluminate spinel on the alumina. The nickel aluminate may comprise from about 5 to about 100 weight percent of the total composition, that is, the nickel aluminate may be present as a major portion of the total composition on a minor core of alumina or the nickel aluminate spinel may be present as a surface layer or layers on the alumina. The calcined composition will have a BET surface area of at least about 50 $m^2/g$. The surface area of the calcined composition may range from about 50 $m^2/g$ to about 250 $m^2/g$. The term "BET" denotes the method of Brunauer, Emmett and Teller, *J. American Chemical Society*, vol. 60 (1983), pages 309–319.

If desired, the calcined composition may be subjected to additional impregnations which may be a series of consecutive impregnations followed by calcination in the same temperature range as the first calcination or the additional impregnation may be performed as a series of impregnations with intervening alternating calcination at temperatures ranging from 600° C. to 1000° C.

The term "spinel" is intended herein to designate a binary oxide having the normal spinel structure or the inverse spinel structure. The normal spinel may be represented by a formula $MY_2O_4$ wherein M and Y are cations of different metals. The inverse spinel may be represented by the formula $Y(XY)O_4$ wherein Y and X are cations of different metals. The sum of the cationic charges of the spinel equals 8. The crystallographic structures of the normal and inverse spinels are given in A. F. Wells, *Structural Inorganic Chemistry*, 3rd Edition, Oxford, Clarendon Press, 1962, pages 487 to 488.

The nickel aluminate spinel on alumina compositions of the present invention may be used as catalysts, catalyst supports and catalyst components. The compositions may be composited with additional catalytic metals such as barium, tungsten, molybdenum, etc. or additional catalytic metal compounds, promoters, catalytic components, inert materials, matrices, as is well known in the art.

The compositions of the present invention are suitable as catalysts in hydrocarbon treating and conversion processes. They are also useful as catalysts in hydrocarbon synthesis. Examples of such processes are methanation, steam reforming, hydrogenation, etc. They are particularly suited for use as steam reforming catalysts.

Steam reforming with the nickel aluminate on alumina composition of the present invention may be conducted in any suitable steam reforming manner. Suitable steam reforming conditions include a temperature ranging from about 1200° to about 1800° F., preferably from about 1400° to about 1600° F., and a pressure ranging from about 0 to about 600 psig at moles of steam to carbon atom of feed ratio ranging from about 1:1 to about 10:1, preferably from about 2:1 to about 8:1. Typically, the steam reforming process is conducted in a steam reforming furnace containing a series of vertically disposed tubes within a furnace box and connected to an inlet header and an outlet header. A mixture of steam and feed to be reformed passes through a series of parallel tubes which are present in the radiant section of the furnace. At least a portion of each tube is packed with a steam reforming catalyst. When the steam reforming process is conducted in such a furnace, suitable space velocities of the mixture of steam and feed range from about 4 to about 800 volumes of mixture to catalyst present. Suitable feeds for the steam reforming process are any of the conventional feeds such as gaseous hydrocarbons (methane, ethane, propane, butane), normally liquid hydrocarbons including naphthas, and kerosene, and lower alcohols. The feed is vaporized and mixed with steam. Hydrocarbon feeds are usually desulfurized prior to being steam reformed. Although the typical steam reforming reaction is carried out in a steam reforming furnace, the steam reforming process of the present invention may be conducted in a fluidized bed operation or dispersed phase operation or any other type of operation where the steam is contacted with the feed in the presence of a catalyst at the required steam to carbon ratio and at steam reforming operating conditions. The hydrocarbon feed may be derived from any source such as petroleum, tar sand oil, shale oil, liquids derived from coal liquefaction processes and mixtures thereof. The gaseous product of the steam reforming process is generally a hydrogen-containing gas which can be purified for use as hydrogen or a synthesis gas ($H_2+CO$) or a fuel gas or a methane-rich gas. The product gas may be used to produce ammonia, methanol, etc., as is well known in the art. The steam reforming conditions used will depend on the desired end product, that is, when a larger proportion of methane is desired rather than hydrogen, known conditions which favor methane production will be used.

PREFERRED EMBODIMENTS

The following examples are presented to illustrate the invention.

EXAMPLE 1

Two hundred fifty grams of 14–35 mesh (Tyler) alumina with a BET surface area of 229 $m^2/g$ and a pore volume of 0.60 cc/g and having a moisture content of 8.2% was impregnated to incipient wetness with 169.59 g of a 50 weight percent solution of nickel nitrate [$Ni(NO_3)_2 \cdot 6H_2O$]. The impregnated solid was dried in an oven at 160° C. for 3 hours with a flow of air to yield 283.21 g of solid. This dried solid was impregnated a second time with 169.74 g of the 50 weight percent nickel nitrate solution, dried in an oven at 160° C. for three hours in a flow of air, and then calcined in a furnace at 700° C. for 16 hours to yield 264.92 g of solid. This solid was then impregnated a third time to incipient wetness with 197.84 g of the 50% nickel nitrate solution, dried for 3 hours in an oven at 160° C. with a flow of air, and calcined in a furnace at 700° C. for 16 hours to yield 289.83 g of solid containing 18.71 weight percent Ni and having a surface area of 123 $m^2/g$ and pore volume of 0.43 $m^2/g$. Examination of this solid by ESCA (electronspectroscopy for chemical analysis) showed the nickel to have reacted to form nickel aluminate spinel. This solid is designated herein "composition A" and is in accordance with the present invention.

EXAMPLE 2

A portion of "composition A" (143.68 g) was impregnated to incipient wetness with a solution of 19.80 g of barium hydroxide [$Ba(OH)_2 \cdot 8H_2O$], 7.6 g of glacial acetic acid, and 58.0 g deionized water. The solid was dried in an oven at 160° C. for 2 hours with a flow of argon, followed by 2 hours at 482° C. also with a flow of argon. The solid yield was 152.78 g containing 6% barium on the nickel spinel (5.66 weight percent Ba on total final weight of solids). The surface area of the final solid was 107 $m^2/g$ and the pore volume 0.39 cc/g. The resulting solid is designated herein "composition B" and is in accordance with the present invention.

EXAMPLE 3

Ethane was steam reformed over a fixed bed of 200 cc of "composition A" at 1450' F., at a pressure of 1 psig, at a feed rate of ethane of 2.6 g moles/hr., at a steam to carbon ratio of 2/1 and with 200 ppm $H_2S$ added. The hydrogen yield as a function of time was measured. The same experiment was done with "composition B" and with a standard commercially available catalyst, herein designated Catalyst S, which contained about 30 wt. % NiO and about 10 wt. % CaO on an alumina support. Results of the experiments are given in Table I.

TABLE I

| Time on Stream, Hr. | Moles $H_2$/Mole Ethane Feed | | |
|---|---|---|---|
| | Composition A | Composition B | Catalyst S |
| 0 | 5.24 | 5.08 | 5.16 |
| 1.5–2 | 5.46 | 5.28 | 5.14 |
| 4–4.25 | 4.97 | 4.99 | 4.18 |

As can be seen from Table I, the activity maintenance of compositions A and B, which are catalysts in accordance with the present invention, was better than that of the commercial steam reforming catalyst "S".

EXAMPLE 4

Evaluation of Catalyst Activity in Absence of Sulfur

Two hundred cc of 178–1080 micron particle size catalyst was charged to a 2" internal diameter reactor; such a charge produces an expanded fluid bed of catalyst 8" deep with a feed gas velocity of 0.6 ft/sec. The catalyst was tested for activity for steam reforming of ethane at 1400° F. and atmospheric pressure by feeding up-flow a mixture of 2.6 g moles/hour of ethane, 10.7 g moles/hour of steam and 6.1 g moles/hour of nitrogen, for six hours. This feed mixture provides a steam to carbon in feed mole ratio of 2. The gaseous products were dried, collected in three two-hour material balances and analyzed by mass spectroscopy. Conversions of feed ethane carbon to the various products are given in Table II for catalyst "Composition A" of the present invention versus Catalyst S.

TABLE II

| % Ethane Carbon Converted To | Catalyst "Composition A" | Catalyst S |
|---|---|---|
| CO | 79.2 | 73.4 |
| $CO_2$ | 20.7 | 24.5 |
| $CH_4$ | 0.1 | 2.1 |
| $C_2H_4$ | — | — |
| Carbon | — | — |
| Unconverted Ethane, % | 0.0 | 0.0 |
| Total | 100.0 | 100.0 |

It can be seen that the catalyst of the present invention was a more active steam reforming catalyst than standard commercial Catalyst S in that substantially all of the feed ethane carbon was converted to carbon oxides, whereas with commercial Catalyst S, two percent of the feed ethane carbon remained as the hydrocarbon methane. A quantitative comparison of the steam reforming activities of these two catalysts is obtained by calculation of the completeness of approach to thermodynamic equilibrium of the methane steam reforming and water gas shift reactions (equation 1 and 2).

$$CH_4 + H_2O \rightleftharpoons CO + 3H_2 \qquad \text{Equation 1}$$

$$CO + H_2O \rightleftharpoons CO_2 + H_2 \qquad \text{Equation 2}$$

On this basis, the approach to equilibrium for Catalyst A was 96.3% whereas the approach to equilibrium for Catalyst S was only 94.1%.

EXAMPLE 5

Evaluation of Catalyst Activity in the Presence of Sulfur

After catalyst evaluation in Example 4, hydrogen sulfide was added to the feed in the amount of 200 ppm on total feed gas and operation continued otherwise under the same conditions for 12 hours. At this time the feed gas mixture was changed to 3.5 g moles/hour of ethane, 7.1 g moles/hour of steam and 9.6 g moles/hour of nitrogen to provide a steam to carbon in feed mole ratio of 1 with adequate gas velocity to maintain the catalyst bed in fluidized condition. Injection of 200 ppm of $H_2S$ was continued. At this lower steam to carbon ratio, it is possible to measure not only the steam reinforcing activity of the catalyst but also its resistance to carbon laydown. Operation under these conditions was continued for 10 hours with three two-hour material balances being taken during the last 6 hours. The gaseous products were dried and analyzed by mass spectroscopy. Conversions of feed ethane carbon to the various products are given in Table III for catalyst "Composition A" and for Catalyst S.

TABLE III

| % Ethane Carbon Converted To | Catalyst "Composition A" | Catalyst S |
|---|---|---|
| CO | 70.8 | 67.4 |
| $CO_2$ | 6.0 | 5.8 |
| $CH_4$ | 5.8 | 7.5 |
| $C_2H_4$ | 9.7 | 8.2 |
| Carbon | 7.4 | 10.6 |
| Unconverted Ethane, % | 0.3 | 0.6 |
| Total | 100.0 | 100.1 |

Catalyst A of this invention exhibited greater steam reforming activity than commercial Catalyst S as shown by the lower amount of unconverted ethane and methane, and also formed less carbon.

The approach to thermodynamic equilibrium for the methane steam reforming and water gas shift reactions was 87.5% for Catalyst A and 84.9% for commercial Catalyst S.

EXAMPLE 6

Twenty grams of alumina having a surface area of 229 $m^2/g$ was impregnated with 14.46 g of 36.04 wt. % solution of $Ni(NO_3)_2.6H_2O$ in water, dried, and calcined at 600° C. for 24 hrs. The recovered solid was reimpregnated with 16.30 g of 55.32 wt. % $Ni(NO_3)_2.6H_2O$ in water, dried, and calcined at 600° C. for 16 hr. Again the recovered solid was impregnated with 16.30 g of 55.32 wt. % $Ni(NO_3)_2.6H_2O$ in water, dried, and calcined at 600° C. for 16 hr. The total amount of nickel from these three impregnations, expressed as NiO, amounts to 5.97 g.

After this total of 56 hour calcining, 77% of the NiO had been converted to nickel aluminate spinel leaving only 23% remaining as NiO as determined by ECSA, i.e. electronspectroscopy for chemical analysis. The surface area of the recovered solid was 145 $m^2/g$. This is Catalyst C of the present invention.

EXAMPLE 7

Preparations similar to Example 6 were performed except that the temperature of calcination was different. Results are tabulated in Table IV. At 1000° C., the reaction of the NiO to form nickel aluminate is complete and the surface area remained greater than 50 $m^2/g$, but at 1038° C. the surface area had been reduced to only 27 $m^2/g$.

TABLE IV

Calcination, 56 hr.
5.97 g NiO derived from $Ni(NO_3)_2.6 H_2O$
20.0 g of high surface area $Al_2O_3$

| Temperature | Surface Area,[1] $m^2/g$ | % of Original NiO Remaining Unconverted to Ni $Al_2O_4$ | Catalysts |
|---|---|---|---|
| 600° C. | 145 | 23 | C |
| 700° C. | 135 | 15 | D |
| 800° C. | 116 | 8 | E |
| 900° C. | 94 | 4 | F |
| 1000° C. | 57 | 0 | G |
| 1038° C. | 27 | 0 | H |

[1]Surface area 229 $m^2/g$ before impregnation which corresponds to 176 $m^2/g$ with the 29.85% NiO deposited thereon.

Catalysts C, D, E, F and G are catalysts in accordance with the present invention. Catalyst H is not a catalyst of the present invention.

As can be seen from Table IV, calcination in the temperature range of 600° C. to 1000° C. gave high conversion of the NiO to nickel aluminate spinel while retaining a total surface area above about 50 $m^2/g$ for the catalyst.

What is claimed is:

1. A composition comprising a nickel aluminate spinel on an alumina support, said composition having been prepared by the steps which comprise:
   (a) subjecting an alumina having a high surface area to at least one impregnation with a nickel component in a liquid medium;
   (b) drying the nickel-impregnated alumina;

(c) calcining the dried nickel-impregnated alumina at a temperature ranging from about 600° C. to about 900° C., and (d) recovering a composition comprising nickel aluminate spinel on an alumina support, said composition having a BET surface area of at least about 94 m²/g.

2. The composition of claim 1, wherein said calcination of step (b) is conducted at a temperature ranging from about 700° C. to about 900° C.

3. The composition of claim 1, wherein said impregnation is performed as a series of impregnations.

4. The composition of claim 1, wherein said impregnation is performed as a series of impregnations with alternating calcinations.

5. The composition of claim 4, wherein said alternating calcinations are conducted at a temperature ranging from about 600° C. to about 900° C.

6. The composition of claim 1 wherein said alumina of step (a) has a BET surface area ranging up to about 500 m²/g.

7. The composition of claim 1, wherein said nickel aluminate spinel comprises at least about 5 weight percent of the total composition.

8. The composition of claim 1, wherein said composition recovered in step (d) has a total BET surface area ranging up to about 250 m²/g.

9. The composition of claim 1, wherein said calcination of step (c) is conducted for a time sufficient to convert at least about 85 weight percent of said nickel component to said nickel aluminate spinel.

10. The composition of claim 1, wherein said calcination of step (a) is conducted for a time sufficient to convert at least about 95 weight percent of said nickel component to said nickel aluminate spinel.

11. The composition of claim 1 wherein said composition recovered in step (d) consists essentially of said nickel aluminate spinel on an alumina support.

12. The composition of claim 1 wherein said alumina of step (a) has a surface area of at least about 94 m²/g.

13. The composition of claim 1 wherein said liquid medium of step (a) is water.

* * * * *